April 7, 1942.   L. A. KEMPTON   2,278,994
ELECTRIC HEATER
Filed April 22, 1941
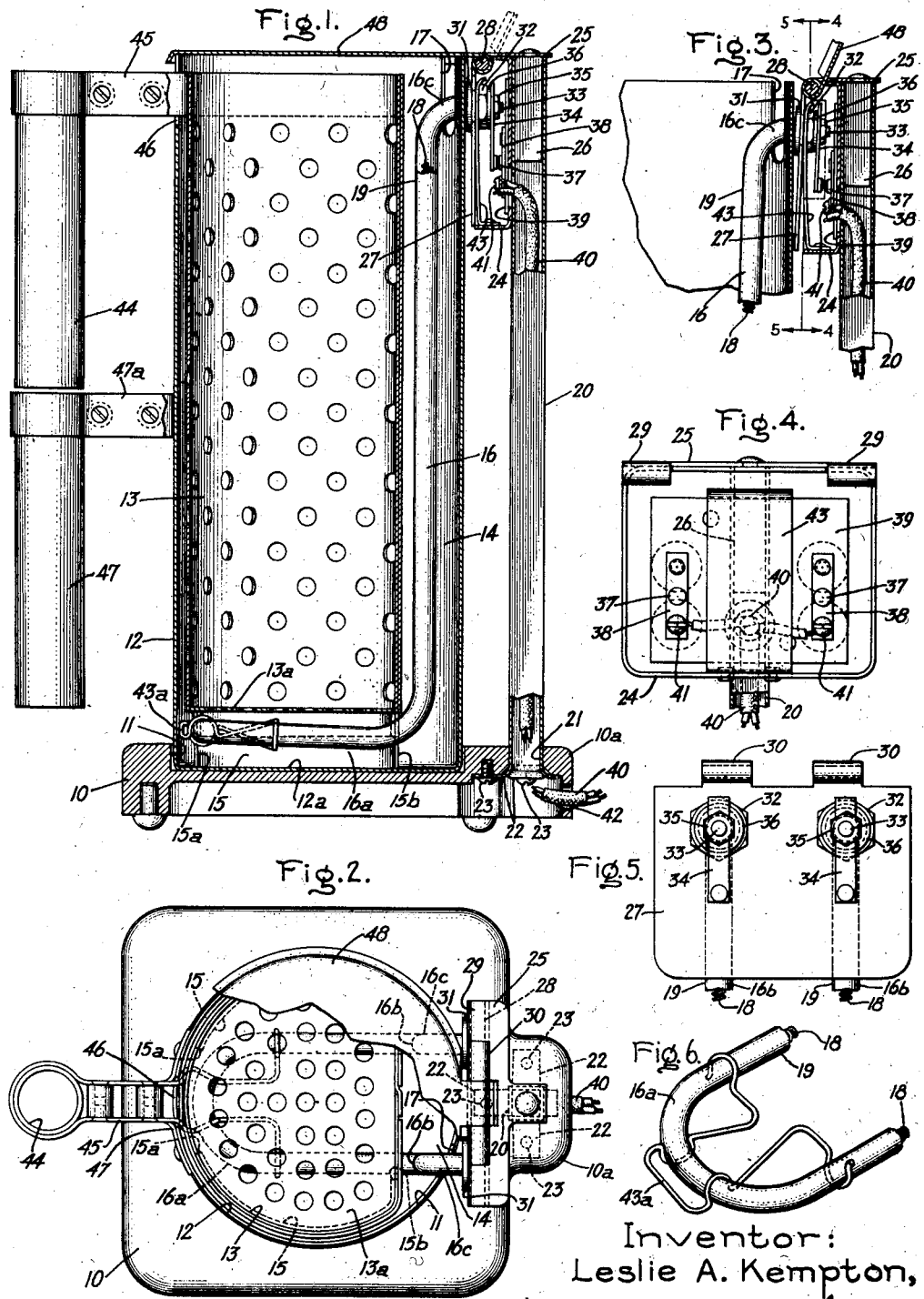
Inventor:
Leslie A. Kempton,
by Harry E. Dunham
His Attorney.

Patented Apr. 7, 1942

2,278,994

UNITED STATES PATENT OFFICE 2,278,994

ELECTRIC HEATER

Leslie A. Kempton, Chicago, Ill., assignor to Edison General Electric Appliance Company, Inc., Chicago, Ill., a corporation of New York Application April 22, 1941, Serial No. 389,783

9 Claims. (Cl. 219—38)

This invention relates to electric heaters, more particularly to electric heaters having a tank for receiving an object to be heated and an electric heater associated with the tank to heat its contents, and it has for its object the provision of an improved heater of this character which automatically deenergizes the heater when the tank is removed from its normal operative position, and energizes the heater when the tank is replaced in its normal operative position.

This invention is especially applicable to an electrically heated sterilizer provided with a sterilizing tank and an electric immersion heater for operating in the tank.

In accordance with this invention, the sterilizer is provided with a suitable base for the tank. The tank is mounted on the base for lateral movement from a normal operative position to an inoperative position. An immersion heater for operating in the tank is controlled responsively to the movement of the tank between these positions so that an energizing circuit for the heater is completed when the tank is moved to its operative position, and is broken when the tank is moved laterally to its inoperative position.

In one specific form of this invention, the heater is pivotally mounted on a standard fixed to the base at one side of the tank. Terminal switch contacts are mounted on the heater, and cooperating line contacts are fixed on the standard. Suitable spring means biases the heater to move with reference to the standard to separate the terminal contacts from the line contacts. When the tank is moved to its normal operative position it engages a part of the heater to move it against the force of the spring means to cause the terminal contacts to engage the line contacts and thereby energize the heater. Should the tank be moved laterally to its inoperative position on the base, the heater is released so that it can be moved by the spring means to cause the contacts to disengage and thereby deenergize the heater.

Preferably, the tank will be provided with a suitable removable perforated basket for holding the utensils that are to be sterilized.

For a more complete understanding of this invention, reference should be had to the accompanying drawing in which Fig. 1 is a vertical elevation mainly in section illustrating an electric heater arranged in accordance with this invention; Fig. 2 is a top plan view of the electric heater of Fig. 1, parts being broken away so as to illustrate certain details of construction; Fig. 3 is a fragmentary vertical elevation of a portion of the heater shown in Fig. 1, certain of the parts of Fig. 3 being shown in different operative positions than the corresponding parts of Fig. 1; Figs. 4 and 5 are sectional views taken through the lines 4—4 and 5—5 of Fig. 3 and looking in the directions of the respective arrows associated with these lines; and Fig. 6 is an enlarged perspective view illustrating a portion of the heating unit used in the heater.

Referring to the drawing, this invention has been shown as applied to an electric heater for sterilizing cutlery and the like. As shown, this heater comprises a suitable base 10 which may be formed of any suitable material, such as cast iron. The base 10 is provided with a centrally arranged circular recess 11 in which is seated a sterilizing tank 12. Arranged to be inserted in the sterilizing tank 12 is a perforated basket 13 in which the cutlery is loaded. The tank 12, as shown, is circular in cross section, while the basket 13 is in the main circular but at the rear is cut off along a chord of the circumference of the tank, as clearly shown in Figs. 1 and 2, so as to leave a space 14 at the rear. The tank 12 and the basket 13 may be formed of any suitable material, but preferably these members will be formed of aluminum.

The lower wall 13a of the basket is spaced somewhat above the bottom wall 12a of the tank, and it is supported in this relation by means of a pair of arcuate-shaped members 15 terminating in ends 15a at the forward part of the tank and in ends 15b at the rear of the tank, as clearly shown in Fig. 2.

Adapted to operate in the tank is a suitable immersion heater 16. The heater 16 has a laterally extending hair-pin shaped section 16a which lies within the space between the bottom wall 12a of the tank and the bottom wall 13a of the basket, as shown. This section also lies between the two arcuate supporting members 15. The two legs of the hair-pin shaped section 16a terminate in spaced-apart upright legs 16b which extend vertically upwardly through the space 14 and terminate in outwardly extending terminal sections 16c. As shown, the upper edge of the tank 12 is provided with slots 17 through which the terminal sections 16c extend to the exterior of the tank.

While any suitable immersion heater may be used, I prefer to use a sheathed heater comprising a helical resistance conductor 18 mounted in a metallic sheath 19, and supported in spaced relation with reference to the sheath by a suitable mass (not shown) of electrically insulating, heat conducting material, such as compacted, powdered magnesium oxide.

The heater 16 is pivotally secured to a suitable hollow upright standard 20 positioned on the base 10 laterally with reference to the tank 12. The base 10 is provided with a rearwardly extending section 10a in which the standard is mounted. As shown, this extension is provided with an aperture 21 in which the lower end of the standard is inserted. The lower end of the standard is provided with a plurality of webs or feet 22 which are fastened to the extension by means of suitable screw-fastening means 23. Preferably, the standard will be formed with a square cross section and the aperture also of course will be provided with a similar cross section. Also, while the standard may be formed of any suitable material, I prefer to make it of aluminum.

Mounted upon the upper end of the standard in the space between the tank and standard is a suitable switch housing 24. This switch housing at its upper end is secured to a plate 25 in any suitable manner, as by welding, and this plate in turn is rigidly secured to a rectangular stud 26 which is inserted in the upper end of the standard 20. The switch housing is formed of integrally united top, bottom, rear and side walls; it is open at the front. This front opening is provided with a cover 27 which is hinged at its upper edge to the plate 25, as shown, by means of a hinge pin 28 received in bearings 29 provided for it on the plate 25 and also in bearings 30 provided on the cover 27.

The terminal sections 16c of the heater are rigidly secured to the cover 27. As shown, these sections are provided with fixed flanges 31 which abut the outer surface of the cover 27, and which are rigidly clamped against the cover by means of nuts 32 threaded on the terminal sections.

Extending from the terminal ends of the heater are suitable terminals 33 upon which are mounted suitable terminal contacts 34. As shown, these contacts are secured to the terminals by means of nuts 35 and are electrically insulated from the nuts 32 by means of electrically insulating washers 36 formed of any suitable material, such as mica.

The terminal contacts are arranged to cooperate with fixed line contacts 37 mounted in the switch housing 24. These contacts are mounted on suitable conducting strips 38 which are rigidly secured to an electrically insulating panel 39 mounted in the switch housing. The contacts 37 are electrically supplied by means of a twin supply conductor 40. The two supply conductors of the conductor 40 are connected to suitable binding screws 41 provided for them on the conducting strips 38. The supply conductor 40 extends through openings provided for it in the switch housing and column and extends downwardly through the standard 20 into the base from which it extends laterally through a suitable opening 42.

Mounted within the switch housing is a suitable spring 43 which, as shown, is of L-shape, one leg of which is rigidly secured to the bottom wall of the switch housing, while the other leg bears against the inner surface of the cover 27. This spring is constructed and arranged to bias the cover outwardly so as to pivot the cover and heater in a clockwise direction, as viewed in Figs. 1 and 2.

It will be observed that when the parts of the device are in their respective positions shown in Figs. 1 and 2, the terminals 34 carried by the heater will engage the fixed contacts 37 so that if the supply conductor 40 be energized the heater itself will be energized. The heater is held in this position against the force of the spring 43 by its engagement with the tank 12. Preferably, the heater will be provided with a metallic clip 43a removably mounted on the nexus and legs of the heater section 16a, as clearly shown in Figs. 1 and 6, and arranged when applied to engage the tank to hold the heater in its energized position. The clip need not be used, and in this case the section 16a of the heater will be lengthened accordingly.

Should the tank 12 be moved laterally away from the standard 20 toward the left, as viewed in Fig. 1, as by elevating the tank from the recess 11 and inclining it in the recess so as to withdraw its lower rear edge outwardly away from the column, the heater 16 will be released so that it is moved by the spring 43 to move the terminal contacts 34 away from the line contacts 37 and thereby break the energizing circuit to the heater. Should the tank be replaced in the recess, the contacts will be closed against the force of the spring to reenergize the heater.

The sterilizer basket 13 is provided with a suitable handle 44 which at its upper end is secured to a suitable bracket 45; this bracket in turn is rigidly secured to the basket, the tank 12 being provided with a slot 46 at its upper end through which the bracket may pass, as shown. The tank is provided with a handle 47 to which it is secured by means of a bracket 47a.

The tank is also provided with a suitable cover 48 which is hinged at the rear to the pin 28, as clearly shown in Figs. 1, 2 and 3.

In the operation of the device, it will be understood that when the sterilizer is inoperative, the tank will be in its tilted position on the base 10 so that it is inclined away from the standard 20. In this position, the heater will be deenergized, as previously described. When it is desired to sterilize, water will be placed in the tank and it will be moved to its operative position in the recess 11. This may be done whether or not the basket 13 is within the tank. If the basket is still within the tank it will be withdrawn by opening the cover 48 and elevating it from the tank for loading it with the objects to be sterilized. When the basket has been loaded, it will be inserted in the tank, and the cover will be closed. After the utensils have been sterilized, the basket will be withdrawn, after which it may be reloaded with objects for sterilizing in the same way. Throughout these operations, the tank will be allowed to remain in its recess 11. When it is desired to cease sterilizing, it is merely necessary to tilt the tank 12 out of its recess, as previously explained, which operation deenergizes the heater 16.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. An electric heater comprising a fixed support, a heater relatively movable with reference to said support, a control switch for said heater operable by the relative movement between said heater and support for establishing an energizing circuit for said heater when said members are moved to one relative position and to break said circuit when said members are moved to another relative position, means biasing said members to said other relative position wherein said switch breaks said energizing circuit, and a water heating container in which said heater operates having a normal operative position with reference to said support and an inoperative position removed from said support, said container having a part engaging a part of said heater to hold said heater in said one relative position when said container is in said operative position and releasing said heater to permit said biasing means to move it to said other relative position when said container is moved to said inoperative position so as to cause said switch to break said energizing circuit.

2. An electric heater comprising a receptacle, an immersion heater within said receptacle, a fixed standard pivotally supporting said immersion heater, switch means on said standard controlling said heater operable by said heater when in one position to close an energizing circuit to the heater and when in another position to open said circuit, means biasing said heater toward said other position wherein said energizing circuit is open, said receptacle engaging a part of said heater to hold it in said one position against the force of said biasing means when said receptacle is in its normal operative position with reference to said standard, and releasing said heater for movement to said other position by said biasing means when moved from said normal operative position away from said standard.

3. An electric heater comprising a base, a tank having a normal operative position on said base, and movable laterally therefrom to an inoperative position on said base, an electric heater separable as a unit from said tank and constructed and arranged to operate in said tank, a support for said heater positioned to one side of said tank, means movably mounting said heater on said support, a control switch for said heater mounted on said support, and means operated by said tank when it is moved to its respective operative and inoperative positions on said base operating said switch to establish an energizing circuit for said heater and to break said circuit.

4. A sterilizer comprising a tank, a base having a recess for receiving said tank, a heater pivotally mounted on said base for operation in said tank, a spring biasing said heater to move in a predetermined direction, said tank preventing movement of said heater in said direction by said spring when said tank is in said recess, a control switch for said heater operated thereby to establish an energizing circuit for said heater when said tank is seated in said recess, and operated to break said circuit by movement of said heater in said predetermined direction by said spring when said tank is tilted at an angle in said recess so that its lower end is moved in said predetermined direction.

5. A sterilizer comprising a base, a tank supported on said base, a standard on said base, a heater for operating in said tank, means pivotally connecting said heater to said standard, spring means on said standard biasing said heater to move away from said standard, a clip mounted on said heater constructed and arranged to be engaged by said tank to prevent said spring means from moving said heater away from said standard, and a switch controlled by said heater when it is restrained by said tank to close an energizing circuit for said heater, and to break said energizing circuit when said heater is moved away from said standard by said spring means as said tank is moved away from said standard.

6. A sterilizer comprising a base, a tank supported on said base, a fixed standard on one side of said tank, a heater for operating in said tank, means pivotally supporting said heater on said standard, spring means on said standard biasing said heater to move away from said standard, means in said tank engaging said heater to prevent it from moving away from said standard, and a switch controlled by said heater when restrained by said means to close an energizing circuit for said heater, and to break said energizing circuit when said heater moves away from said standard, the heater being permitted to move away from said standard when said tank is moved away from said standard.

7. A sterilizer comprising a base, a tank, a fixed upright standard on said base at one side of said tank, a switch housing mounted on the upper end of said standard, fixed line contacts in said housing, an immersion heater constructed and arranged to operate in said tank pivoted to said housing and carrying terminal contacts arranged to engage said fixed contacts, means biasing said heater to pivot away from said standard to break said contacts, said tank engaging a part of said heater to hold it in position to make said contacts, and when moved away from said standard releasing said heater to permit it to move to break said contacts.

8. A sterilizer comprising a base having a recess therein, a tank seated in said recess, a fixed upright standard on said base at one side of said tank, a switch housing mounted on the upper end of said standard open at its side facing said tank, fixed line contacts in said housing, an immersion heater constructed and arranged to operate in said tank, a cover for said housing pivoted thereto to swing on a transverse axis at the upper end of said cover, means securing said heater to said cover, terminal contacts secured to the terminals of said heater and engaging said line contacts when said cover is closed, a spring biasing said cover to open to carry said terminal contacts away from line contacts, said tank engaging a part of said heater so as to hold said cover closed, and releasing said cover to permit it to open when the tank is inclined in said recess so that its lower end is moved outwardly away from said standard in the plane of movement of said cover.

9. A sterilizer comprising a base having a recess therein, a tank seated in said recess, a fixed upright standard on said base at one side of said base, a switch housing mounted on the upper end of said standard open at its end facing said tank, fixed line contacts in said housing, an immersion heater constructed and arranged to operate in said tank having a hair-pin section positioned transversely in said tank above its bottom wall and a pair of legs extending upwardly in said tank from said hair-pin section, said legs terminating in laterally extending terminal sections extending laterally from said tank through slots provided for them in said tank, said sections having terminals extending therefrom, a cover for said housing, means pivoting the upper end of said cover to said housing to swing in a transverse axis, said terminal sections projecting through said cover into said housing, means securing said sections to said cover, switch contacts secured to said terminals engaging said line contacts when said cover is closed, a spring biasing said cover to open, a perforated utensil basket in said tank positioned to one side of said upwardly extending legs and having a base straddling said hair-pin section, said tank engaging a part of said hair-pin section so as to hold said cover closed, and releasing said cover to permit it to open when said tank is inclined in said recess so that its lower end is moved outwardly away from said standard in the plane of movement of said cover.

LESLIE A. KEMPTON.